United States Patent Office 3,509,792
Patented May 5, 1970

3,509,792
BALL MOUNT, PARTICULARLY FOR ARMORED VEHICLES
Walter Ruf, Landhaus am Sec, Bottinghofen, Thurgau, Switzerland
Filed July 3, 1968, Ser. No. 742,409
Claims priority, application Austria, Apr. 18, 1968, A 3,805/68
Int. Cl. F41h 5/26; F41f 23/00
U.S. Cl. 89—37                 11 Claims

ABSTRACT OF THE DISCLOSURE

An improved ball mount, particularly for armored vehicles, with a spherical member with openings adapted to receive a gun and a sight block, and arranged rotatably in the wall of the armored vehicle, such that a target can be directly sighted by means of a sight of the gun through the sight block from the interior of the armored vehicle, and protected againts enemy fire, wherein the improvement comprises that, with withdrawn gun, the spherical member is arranged to be pivotable through such an angle that the holes receiving the sight block and the gun are fully screened and protected against enemy fire; that the spherical member is mounted in a split ring equipped with a spherical recess, wherein one part of the ring is mounted on the wall of the armored vehicle and connected to the other by a bayonet lock; that the spherical member is connected with a bayonet lock type gun safety, securing the gun against accidental withdrawal and connected undisplaceably and positively, and more particularly non-rotatably with the said spherical member.

DESCRIPTION

The invention relates to a ball mount, and more particularly to a ball mount for mounting guns of the type generally referred to as small arms, and including pistols, rifles and machine guns and the like, in armored vehicles.

There is already known in the art to provide a ball mount, especially for armored vehicles, comprising a divided or split ring fixed to the wall of an armored vehicle, and equipped with a spherical recess for receiving a rotatably moveable spherical member. The said spherical member has an opening for a sight block and for the barrel of a gun. When the barrel of the gun is pushed into the corresponding opening in the spherical member, the sight block is aligned with the sight of the gun, enabling a target to be sighted directly by means of the gun sight and the sight block from the interior of the armored vehicle which is protected by its armour against enemy fire.

It is an object of the invention to provide an improved ball mount of the kind hereinbefore described, comprising a particularly strong armor of the ball mount against enemy fire from the outside.

This object is achieved in that, when the gun is withdrawn, the said spherical mounting member may be swivelled through an angle such that the openings adapted to receive the sighting block and the barrel of the gun are completely screened and covered against external enemy fire.

It is a further object of the invention to provide an improved ball mount of the kind hereinbefore described, in which the construction is simplified and the stability improved.

This object is realized according to the invention in that the spherical member is mounted in a divided ring, provided with a spherical recess, wherein the outer part of the ring is mounted on the wall of the armored vehicle and is connected to the inner part of the ring by a bayonet locking mechanism.

It is yet another object of the invention to provide an improved ball mount of the kind hereinbefore described, wherein the gun is located firmly and fixedly in the receptacle in the ball mount and is secured against being accidentally removed.

According to the invention, this object is realized in that the spherical member is connected to a bayonet lock type gun safety device which secures the gun against being accidentally withdrawn and whereby it is connected with the spherical member in a fixed and positive, and more particularly, in a non-rotatable manner.

In a preferred embodiment of the invention, the spherical member is swivelled in a horizontal plane through and angle of 90° into the locked position, in order to provide the desired screening and cover against enemy fire from the outside. Preferably, during this movement, the opening in the ball mount is completely covered by the said inner and outer rings.

According to a further preferred feature of the invention, the said outer ring is airtight and watertight, and welded in an ABC-safe manner to the outside of the wall of the armored vehicle; conveniently, a seal is provided between the said outer ring and the spherical member.

Preferably, the inner ring is secured in the outer ring by means of a screw.

Another preferred embodiment of the invention comprises means, whereby the tilting of the gun and the rotation of the spherical member about the longitudinal axis of the gun are prevented; conveniently, these means comprise a lug mounted on the inner ring, engaging into a groove in the spherical member and preventing the rotation of the ball mount about the longitudinal axis of the gun.

The invention will be further described, by way of example, with reference to the accompanying drawing, showing a preferred embodiment, and in which.

Figure 10:
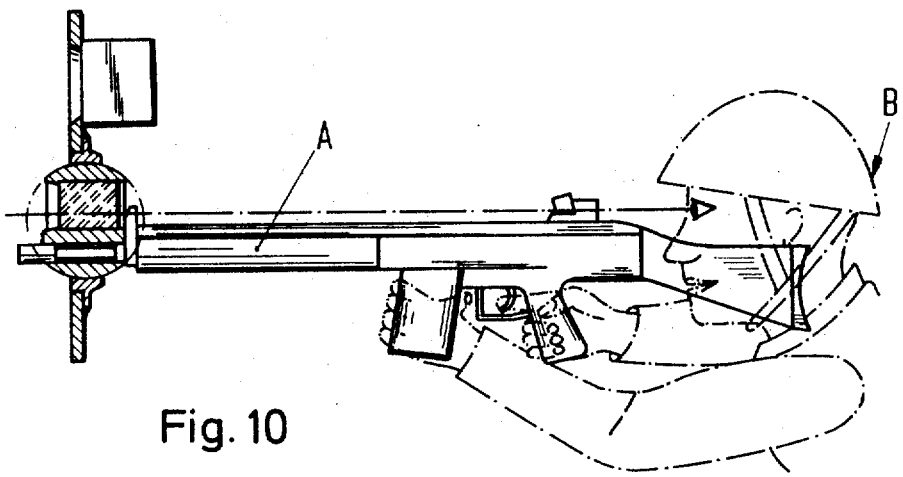
FIG. 10 shows schematically the arrangement of a ball mount with a gun and a rifleman.

FIG. 11 shows schematically the arrangement of the ball mount according to the invention in which a gun A is inserted. As can be seen from FIGURE 10 an exterior target can be directly sighted by means of a sight of the gun from the interior of the armored vehicle which is protected against enemy fire. The eye and the sight of the gun are in alignment with a sight block of the ball mount.

An outer ring or annulus 2 is welded into an sloping side wall 1 of an armored vehicle. An inner ring 3 is connected to the outer ring 2. Both the inner ring 3 and the outer ring 2 have a spherical recess adapted to receive a spherical member 4 for the rotational movement thereof. After the insertion of the spherical member 4 into the spherical recess of the outer ring 2, the inner ring 3 is fitted into the outer ring 2 and locked therein by rotating a bayonet-type locking mechanism, whereby projections or lugs of the inner ring 3 engage into corresponding recesses in the outer ring 2. The inner ring 3 is secured in the outer ring 2 by a fixing screw 10.

A seal 5 provides the spherical member 4 against the outer ring with an airtight, dustproof, watertight and ABC seal. Also the weld between the outer ring 2 and the side wall 1 is air and watertight and ABC-proof. This weld may also be replaced by a bolted connection between the outer ring 2 and the side wall 1; in this case, a seal or gasket is fitted between these two parts and provides also an air and water-proof, dustproof and ABC seal. Furthermore, a seal 30 may be provided in the continuous hole 14 to form an airtight, watertight, dustproof and ABC seal between the spherical member 4 and the gun inserted into the hole 14.

Within the spherical member 4, there is a continuous hole 6, adapted to receive a sight block 7. This sight block 7 is pushed in the opening 6 against a shoulder and the joint between the shoulder and the sight block 7 is sealed by a sealing member 8, which forms also an air and watertight, dustproof and ABC seal. The sight block 7 is retained in the hole 6 by a securing ring 9, adapted to be rotated and acting thereby after the manner of a bayonet locking mechanism.

A guide pin 12 is connected to the inner ring 3 by means of a screw 11 and engages into a groove 13 in the spherical member 4, thereby stabilizing the spherical member 4 in the vertical direction and preventing any undesirable rotation or tilting of the gun about its longitudinal axis, i.e., the gun stays in vertical alignment during the firing.

Underneath the opening 6 for the sight block 7, the spherical member 4 has a further continuous hole 14, adapted to receive the barrel of the gun. On the inside of the hole 14, there is a shock-absorber spring 14a, the bottom turn of which forms a lock ring and is secured in a groove.

The spherical member 4 can be rotated in the horizontal plane through 90° into the so-called closed position, in which the openings 6 and 14 are completely covered by the inner and outer rings and are protected thereby, giving an excellent armor against external fire and forming a complete air and watertight, dustproof and ABC seal. In the closed position, the spherical member 4 is retained by a safety mechanism. This safety mechanism comprises a threaded stud 15, screwed into the spherical member 4 and extending outwardly through a conical bore 15a in the inner ring 3. A cylindrical plunger 16 with an internal bore is adapted to slide on the threaded stud 15. A part of the inner bore of the cylindrical plunger 16 has a larger diameter than the threaded stud 15 so that a helical spring 17 can be mounted in the annular gap between the inner bore and the threaded stud 15; this spring is retained by a flange 18 on the threaded stud 15 or by a circlip and presses the cylindrical plunger 16 with a certain force into the conical hole 15a of the inner ring 3, producing a form-locking connection between the inner ring 3 and the spherical member 4 and effectively preventing a relative movement between these two parts. The end of the plunger 16, engaging into the conical hole 15a, has a correspondingly conical configuration. The outer side of the center hole in the cylindrical plunger 16 is closed by a flap 19.

Figure 1:
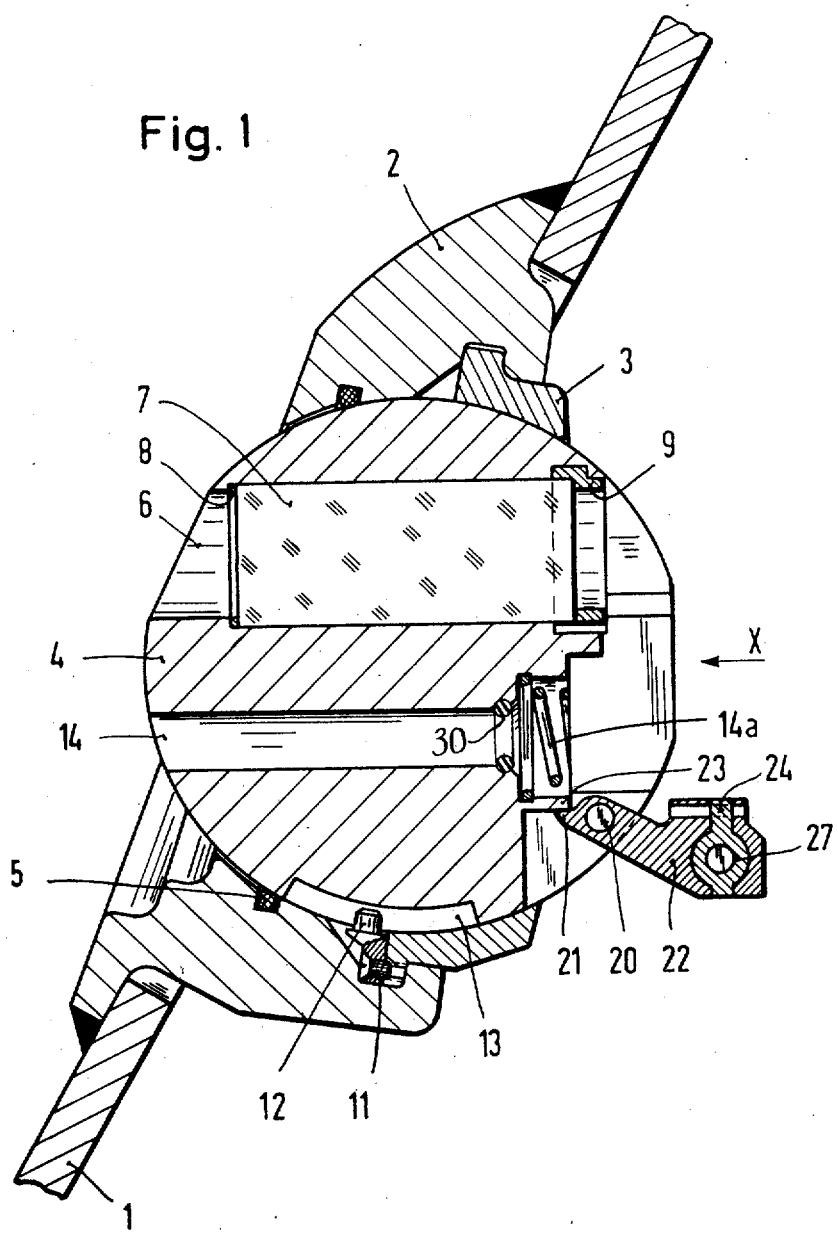
FIG. 1 is a vertical cross-section of a ball mount in the firing position, wherein the outer ring is welded into the sloping side wall of an armored vehicle.
Figure 2:
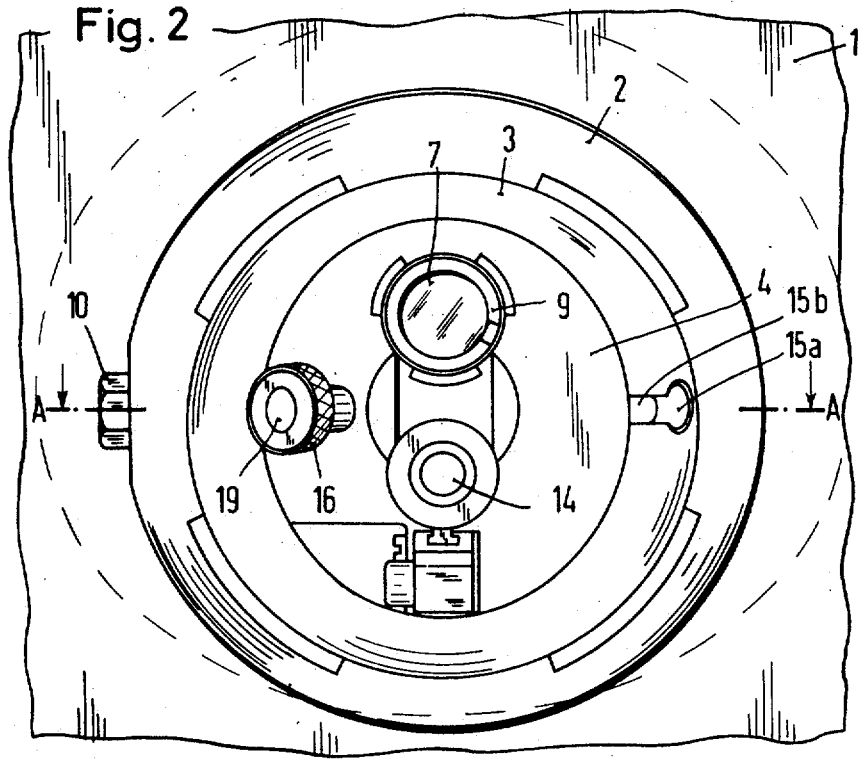
FIG. 2 is a view of the ball mount, viewed from the inside in the direction of the arrow X in FIG. 1.

The cylindrical plunger 16 can be pulled outwardly against the force of the spring 17, enabling the threaded stud 14 to be removed inside the ring 3 from the conical hole 15a by swivelling the spherical member 4. To this end, as shown in FIG. 2, the conical recess 15a has an oblong hole 15b, extending to the outer edge of the inner ring 3. When the threaded stud 14 has left the conical recess 15a and oblong hole 15b', the spherical member 4 can be freely swivelled.

Figure 3:
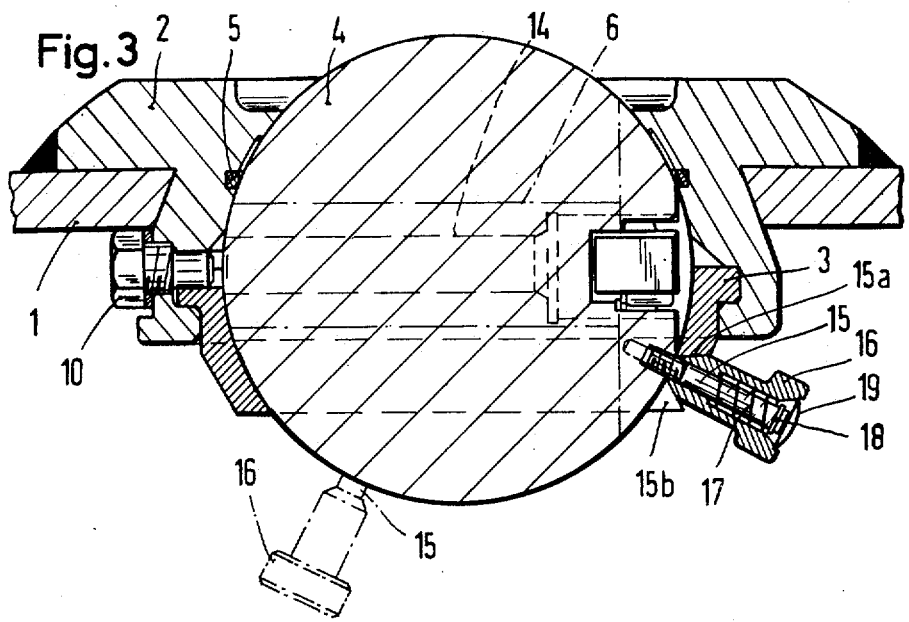
FIG. 3 is a horizontal cross-section along the line A—A in FIG. 2, with the ball mount in the closed position.
Figure 4:
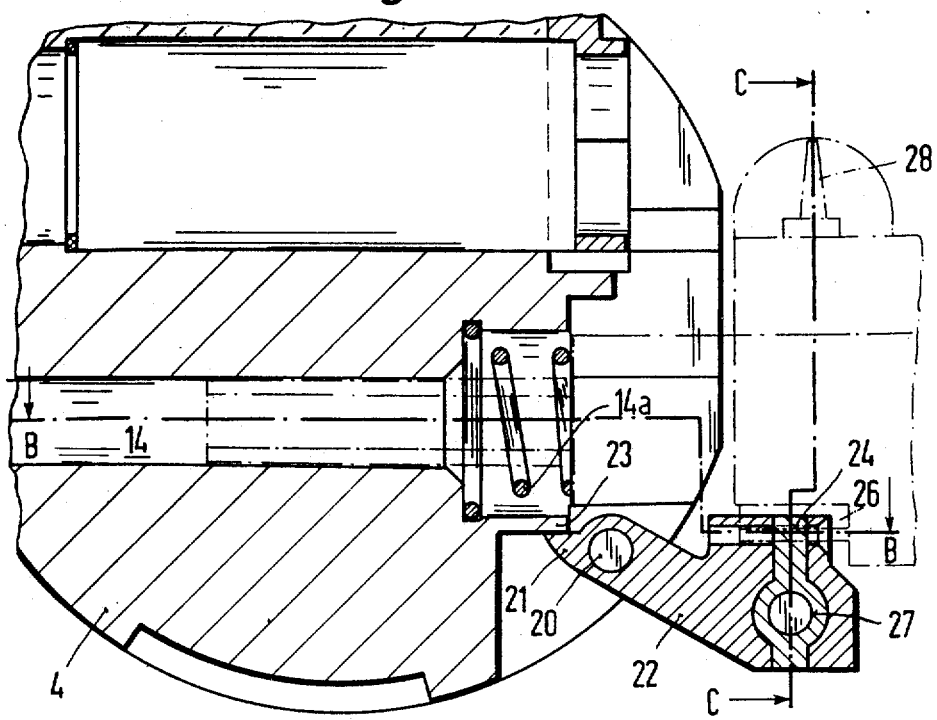
FIG. 4 is a vertical cross-section of the spherical member of the ball mount shown in FIGS. 1 to 3, with opened gun safety mechanism and fitted gun, the gun being shown by chain-dotted lines.
Figure 5:
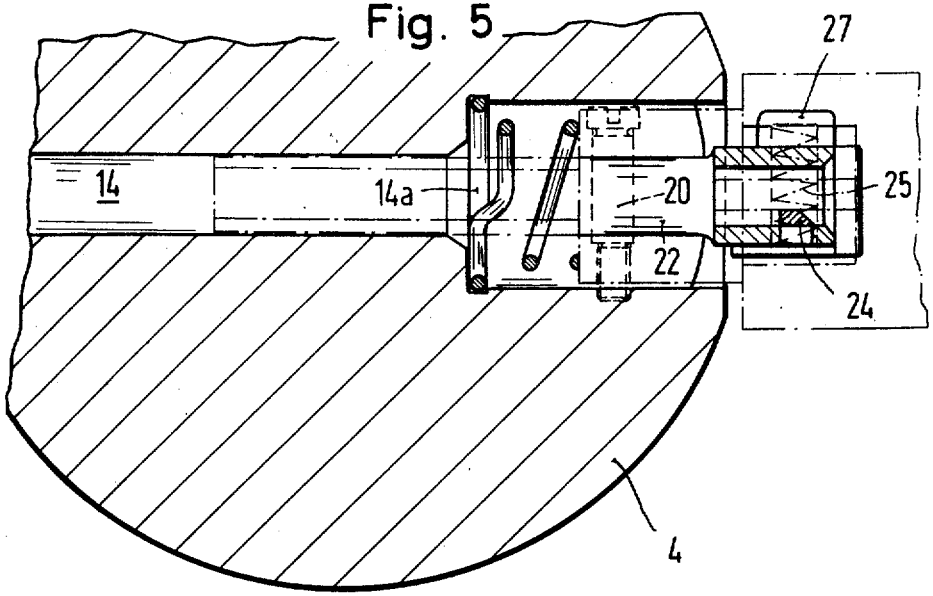
FIG. 5 is a horizontal cross-section of the spherical member of FIG. 4 along the line B—B with opened gun safety and fitted gun.
Figure 6:
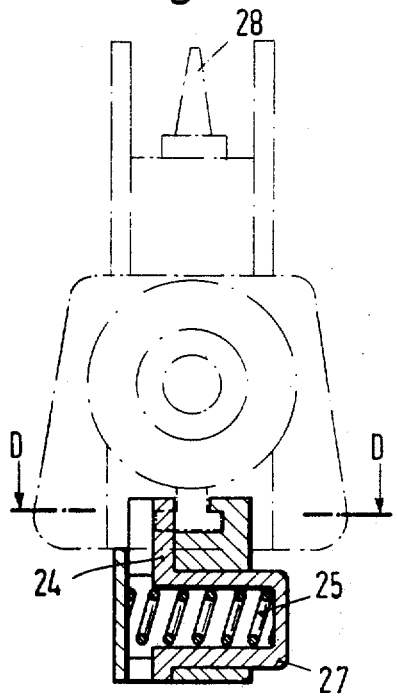
FIG. 6 is a vertical cross-section of the gun safety mechanism along the line C—C in FIG. 4, with secured gun.
Figure 8:
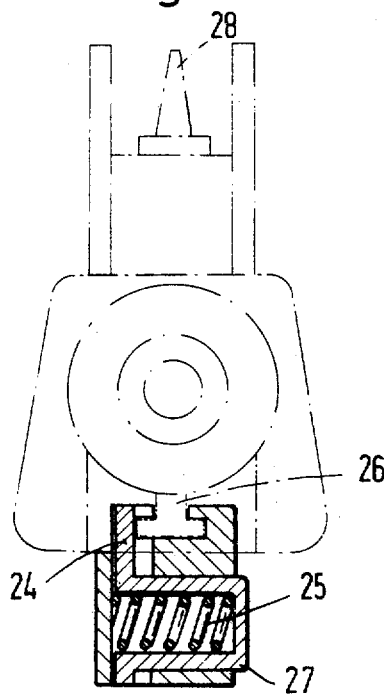
FIG. 8 is a vertical cross-section of the gun safety mechanism, with the safety in the "off" position for withdrawing the gun.
Figure 7:
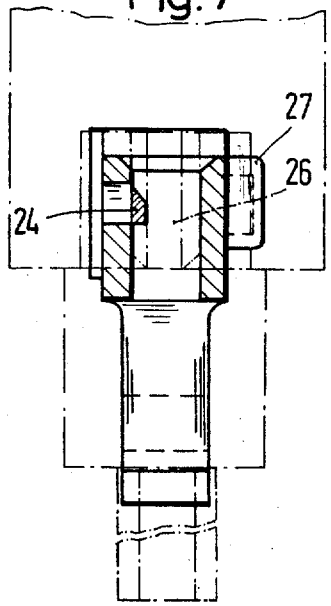
FIG. 7 is a horizontal cross-section along the line D—D in FIG. 6, with secured gun.
Figure 9:
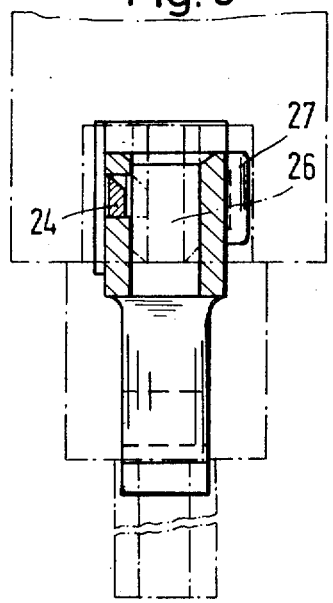
FIG. 9 is a horizontal cross-section of the gun safety mechanism, with the gun safety in the "off" position, for withdrawing the gun.

A gun safety mechanism is hinged pivotably and swivellably to the spherical member 4 by means of a stud 20. The spherical member 4 has a recess, into which the safety mechanism can be pivoted upwardly so that, in the closed position of the ball mount, as shown in FIG. 3, the safety mechanism is within the spherical recess between the inner and outer rings. After pivoting the ball mount from the closed position into the firing position, the gun safety is moved down, as shown in FIG. 4, and engages a lug 21 on a level 22 against a flange 23 of the spherical member 4. When the gun is pushed into the opening 14 of the spherical member 4 and into the gun safety mechanism, equipped with a bayonet type lock, a pawl 24 engages automatically under the action of a spring 25 into a bayonet-like recess of the gun. This engagement of the pawl 24 into the bayonet-like recess 26 secures the gun against accidental withdrawal.

If the gun is to be removed from the opening 14 in the spherical member 4 and from the gun securing mechanism, a housing 27 of the pawl 24, projecting beyond the lever 22, is depressed against the force of the spring 25, disengaging the pawl 24, and enabling the gun to be withdrawn.

In view of the fact that the distance between the gun stop in the spherical member 4 and the ratchet engagement of the bayonet lock 26 are not the same with all guns, a shock-absorber spring 14a is provided, ensuring that the bayonet recess 26 is firmly pressed against the pawl and the gun is retained in the spherical member 4 in a firm and fixed manner.

The sight block is aligned with a sighting device of the gun, shown only partly at 28 in FIG. 4 so that an external target can be sighted directly through the sight block from the protected inner chamber of the armored vehicle, wherein the ball mount 4 with the sight block 7 carries out the same movements as the gun.

A ball mount constructed according to the invention has the following advantages.

Due to the swivelling of the spherical member from the firing position into the closed position, excellent protection is obtained against enemy fire. At the same time, the construction provides a fully effective, air and watertight, dustproof and ABC seal.

By the connection between the inner and outer rings by means of a bayonet-like lock, a stable and structurally very favourable construction is obtained, also with regard to the bayonet-type lock for mounting the sight block.

In view of the bayonet-type gun locking mechanism, the gun is secured against accidental withdrawal, whilst being simultaneously firmly and non-rotatably connected to the spherical ball mount member. The locking device can be released by simple thumb pressure by the operator. The insertion of withdrawal of the gun is effected simply and quickly.

Tilting of the gun, i.e., rotation about its longitudinal axis, is prevented by the groove in the spherical member cooperating with the guide lug mounted on the inner ring.

The ball mount follows any pivoting and rotational movement of the gun so that the target can be sighted directly from inside the armored vehicle through the sightblock, aligned with the sight of the gun and forming a sight line.

The ball mount according to the invention forms a perfect air and watertight, dustproof and ABC seal, and maintains the seal and ABC safety of the internal compartment of the vehicle and of the crew.

The guns suitable for use with the invention are preferably submachine guns, assault guns and machine guns.

The present invention may be embodied in other specific forms without thereby departing from the spirit or essential characteristics thereof.

I claim:

1. A ball mount for providing a gun port in a wall, particularly for armored vehicles and the like, comprising a ball member having two adjacent, substantially parallel openings therethrough, one of said openings serving to receive a gun with a sighting means, a sight block mounted in the other of said openings, means for rotatably mounting said ball member in said wall so that said ball member can be swivelled in conjunction with the gun and an external target can be sighted through the gun sighting means and sight block directly from the protected side of the wall, said ball member, when the gun is dismounted, being capable of being swung to a closed position in which both said openings are covered by said mounting means, a recess in said ball member, gun securing means for securing said gun in said one opening against rotation and accidental withdrawal comprising, a lever member one end of which is pivotally mounted in said recess, an opening formed on the other end of said lever for the form-locked reception of a portion of the barrel of said gun, and a spring-loaded pawl means adjacent said last mentioned opening to engage with and secure said gun, said lever member being pivoted to lie completely within said recess when said ball member is moved to the closed position.

2. A ball mount according to claim 1 further comprising seal means between said mounting means and said ball member, between said sight block and said ball member, and between said gun and said ball member, said seal means providing an airtight, watertight, dust-proof and ABC seal.

3. A ball mount according to claim 1 further comprising handle means on said gun securing means for manually disengaging said spring-loaded pawl from said gun for dismounting said gun.

4. A ball mount according to claim 1 further comprising spring means adjacent said one opening and acting to bias said gun against said gun securing means.

5. A ball mount according to claim 1 further comprising locking means for securing said ball member in the closed position.

6. A ball mount according to claim 5 in which said locking means comprises bolt means secured in said ball member, a cylindrical member mounted on said bolt, recess means formed in said mounting means to receive said cylindrical member, and spring means biasing said cylindrical member towards said ball member whereby said cylindrical member will be locked in said recess means in the closed position of said ball member.

7. A ball mount according to claim 1 in which said ball is swingable in a horizontal plane through an angle of about 90° into the closed position.

8. A ball mount according to claim 1 in which said mounting means comprises an outer ring and an inner ring, said outer ring being fixedly secured to said wall, bayonet locking means formed on said rings for connecting said inner and outer rings together and securing said ball member therebetween.

9. A ball mount according to claim 8 further comprising screw means for securing said inner ring to said outer ring.

10. A ball mount according to claim 1 further comprising means for preventing tilting of the gun and rotation of the ball member about the longitudinal axis of the gun, and comprising a guide lug formed on said mounting means and an elongated groove formed in said ball member and receiving said lug therein.

11. A ball mount according to claim 1 further comprising bayonet locking means for securing said sight block in said other opening.

References Cited

UNITED STATES PATENTS

| | | |
|---|---|---|
| 487,746 | 12/1892 | Johnson. |
| 523,209 | 7/1894 | Keely. |

FOREIGN PATENTS

| | | |
|---|---|---|
| 1,255,537 | 11/1967 | Germany. |
| 470,376 | 8/1937 | Great Britain. |

BENJAMIN A. BORCHELT, Primary Examiner

S. C. BENTLEY, Assistant Examiner